(12) United States Patent
Song et al.

(10) Patent No.: US 8,553,747 B2
(45) Date of Patent: Oct. 8, 2013

(54) METHOD FOR CONNECTING BASE STATION AND REPEATER FOR SPATIAL DIVISION MULTIPLE ACCESS AND REPEATING METHOD THEREOF

(75) Inventors: Young Seog Song, Daejeon (KR); Dong Seung Kwon, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 910 days.

(21) Appl. No.: 12/670,539

(22) PCT Filed: Jul. 11, 2008

(86) PCT No.: PCT/KR2008/004098
§ 371 (c)(1),
(2), (4) Date: Jan. 25, 2010

(87) PCT Pub. No.: WO2009/020291
PCT Pub. Date: Feb. 12, 2009

(65) Prior Publication Data
US 2010/0208776 A1     Aug. 19, 2010

(30) Foreign Application Priority Data
Aug. 7, 2007 (KR) .................. 10-2007-0078918

(51) Int. Cl.
*H04B 3/36* (2006.01)
(52) U.S. Cl.
USPC ........................................................ 375/211
(58) Field of Classification Search
USPC ...... 375/211, 214, 267; 370/334; 455/422.1, 455/11.1
See application file for complete search history.

(56) References Cited

U.S. PATENT DOCUMENTS

| 7,200,391 B2 | 4/2007 | Chung et al. |
| 2007/0160014 A1* | 7/2007 | Larsson .................. 370/338 |
| 2008/0045212 A1* | 2/2008 | Kim et al. ............... 455/435.1 |
| 2008/0049665 A1* | 2/2008 | Sakata et al. ............ 370/328 |
| 2008/0108305 A1* | 5/2008 | Lin et al. ................ 455/11.1 |
| 2009/0227202 A1* | 9/2009 | Doppler et al. .......... 455/11.1 |

FOREIGN PATENT DOCUMENTS

| KR | 10-2005-0120972 A | 12/2005 |
| KR | 10-2006-0121621 A | 11/2006 |
| KR | 10-2008-0051999 A | 6/2008 |
| WO | 02/087275 A2 | 10/2002 |

* cited by examiner

*Primary Examiner* — Don N Vo
(74) *Attorney, Agent, or Firm* — Jefferson IP Law, LLP

(57) ABSTRACT

The present invention relates to a method for connecting a base station and a repeater for a spatial division multiple access, and a repeating method thereof. In order to provide efficient spatial division by using a repeater, data streams are repeated by using a repeating system including at least one repeater for performing wireless communication with a terminal located in a repeating region controlled by using at least one repeating antenna and a base station including a plurality of base station antennas corresponding to the repeating antenna. In this instance, the terminal detects location information on the repeating region to which the terminal belongs by using the pilot signal transmitted by the base station or repeated by the repeater. Location information detected by the terminal is fed back to the base station so that the base station may use it for the spatial division multiple access for simultaneous transmission to many terminals. Therefore, the spatial division multiple access for increasing sector capacity by efficiently combining the base station including multiple antennas and the repeater is available.

18 Claims, 3 Drawing Sheets

METHOD FOR CONNECTING BASE STATION AND REPEATER FOR SPATIAL DIVISION MULTIPLE ACCESS AND REPEATING METHOD THEREOF

TECHNICAL FIELD

The present invention relates to a base station system and a repeating method thereof, and particularly, it relates to a method for connecting a base station and a repeater for the spatial division multiple access, and a repeating method thereof.

BACKGROUND ART

From among wireless transmission techniques, skills for increasing sector throughputs by using multiple antennas have been researched. The spatial division multiplexing (SDM) skill, a representative skill for increasing sector throughputs, acquires the multiplexing gain by transmitting different signals to a plurality of antennas. Also, the precoding SDM scheme for transmitting data streams by forming a plurality of beams having less interference between antennas by using multiple antennas increases the sector throughputs.

The scheme for a single base station to transmit singular or plural data streams to a plurality of terminals is called the spatial division multiple access (SDMA). It is applicable to the case of transmitting a signal in the downlink and the case of receiving a signal in the uplink.

In this instance, in order to acquire the effect of increasing the sector throughput by using the SDMA, it is required to concurrently transmit as large a plurality of data streams as possible, which is allowable only when the received signal to noise ratio (SNR) of a plurality of terminals undergoing multiple transmission is great. However, the spatial multiplexing is allowable only in an area that is near the base station having a great terminal SNR, and is difficult to be applied to a terminal that is distant from the base station. That is, the spatial multiplexing is only applicable to the partial region of a cell.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a system for efficiently using the spatial division multiple access scheme, and a repeating method thereof.

The present invention has been made in another effort to provide a signaling method for a common control signal transparently operable to a base station region and a repeater region.

Technical Solution

An exemplary embodiment of the present invention provides a method for repeating a data stream transmitted by a base station including a plurality of antennas to a terminal in a region of a repeater including: transmitting a plurality of data symbols including a plurality of pilot signals, a number of the pilot signals corresponding to a number of the antennas; receiving region information generated based on the plurality of pilot signals from a plurality of terminals; checking location information on the plurality of terminals based on the region information, and selecting a terminal for transmitting a data stream from among at least one terminal located in the repeater; and transmitting the data stream to the selected terminal.

Another embodiment of the present invention provides a repeating method for a terminal to receive a data stream from a base station including a plurality of antennas through a repeater including: receiving a data symbol including a pilot signal from the base station; checking a location region of the repeater in which the terminal is located from the power of the pilot signal; generating terminal location information of the terminal through the checked location region and transmitting the terminal location information to the base station; and receiving a data stream from the base station.

Advantageous Effects

According to the exemplary embodiment of the present invention, sector capacity can be increased by efficiently combining a base station having multiple antennas and a repeater, and data streams using the spatial division multiple access scheme can be easily transmitted/received irrespective of the subchannel structure in the mobile communication system for orthogonal frequency division multiplexing (OFDM) transmission.

Further, the exemplary embodiment of the present invention is economical since it increases the number of data streams that are simultaneously transmitted even when the repeaters having the same number as those connected to a single transmit antenna base station are used.

MODE FOR THE INVENTION

Figure 1:
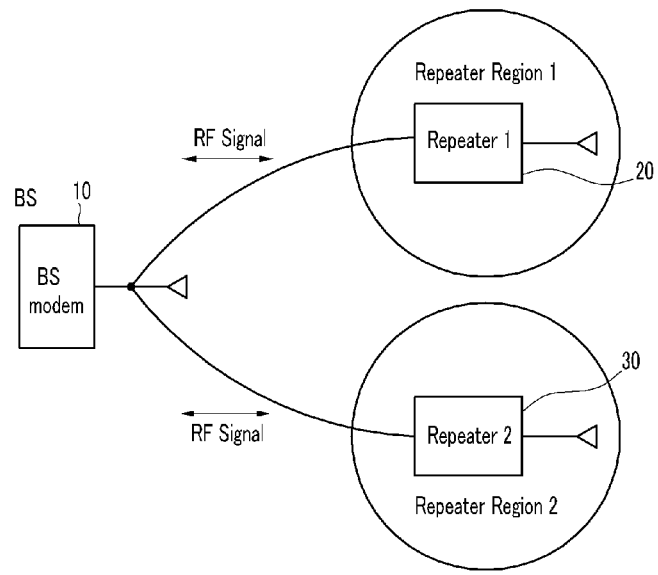
FIG. 1 shows a method for connecting a base station using a general single antenna and an optical repeater.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements. In addition, the terms "-er", "-or", and "module"

described in the specification mean units for processing at least one function and operation and can be implemented by hardware components or software components, and combinations thereof.

In the specification, a mobile station (MS) may indicate a terminal, a mobile terminal (MT), a subscriber station (SS), a portable subscriber station (PSS), user equipment (UE), or an access terminal (AT), and may include whole or part functions of the mobile terminal, subscriber station, portable subscriber station, user equipment, and access terminal.

In the specification, a base station (BS) may indicate an access point (AP), a radio access station (RAS), a node B (Node B), a base transceiver station (BTS), or a mobile multihop relay base station (MMR-BS), and may include whole or part functions of the access point, the radio access station, the node B, the base transceiver station, and the mobile multihop relay base station.

Before a repeating system according to an exemplary embodiment of the present invention is described, a repeater is generally used so as to eliminate the blanket area in a cell or to extend coverage. That is, when a repeater is installed in the blanket area, the SNR is increased to eliminate the blanket area, and when a repeater is installed in an area out of the cell radius of the base station, the coverage is extended.

The repeater includes an optical repeater, an RF repeater, and a microwave repeater. The optical repeater converts the RF signal of the base station into a digital optical signal or an analog optical signal, loads it on an optical fiber, transmits it to a repeating region, converts it again into an RF signal, and transmits it to the terminal. In the case of the RF repeater, a receive antenna is installed in the repeating region, and the RF repeater receives a base station signal, amplifies it, and transmits it through a transmit antenna.

The microwave repeater converts a base station signal into a microwave of another region, transmits it to a repeater in the repeating region in a radio manner, converts it into an RF signal of the original frequency domain, and transmits it. A general connection method between a base station and an optical repeater in the case of using the optical repeater from among the various repeaters will now be described with reference to FIG. 1.

FIG. 1 shows a connection method between a base station using a general single antenna and a repeater.

As shown in FIG. 1, when repeaters (first and second repeaters) 20 and 30 are installed for the base station 10 having an antenna, the base station 10 and the repeaters 20 and 30 provided in the blanket area are connected through optical fibers. In this instance, the repeaters 20 and 30 are installed in the blanket area of the repeater region to eliminate the blanket area, or they are installed out of the cell radius of the base station 10 to extend the coverage. Here, the repeaters 20 and 30 will be exemplified as using optical repeaters.

The signals transmitted/received between the base station 10 and the first and second optical repeaters 20 and 30 are RF signals. That is, a modulation/demodulation unit of the base station 10 converts the RF signal to be output by the base station into a digital signal or an analog signal, and uses the optical cable connected to the single antenna to transmit the corresponding signal to the first or second optical repeater 20 or 30.

A structure for extending the connection between the base station and the repeater shown in FIG. 1 will now be described with reference to FIG. 2.

Figure 2:
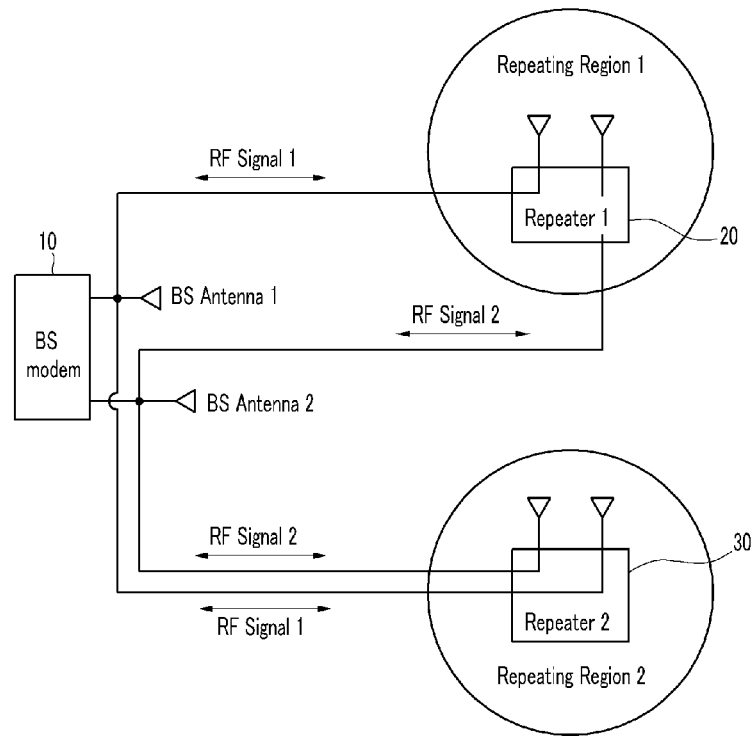
FIG. 2 shows a method for connecting a base station using general multiple antennas and an optical repeater.

FIG. 2 shows a connection method between a base station using general multiple antennas and an optical repeater.

As shown in FIG. 2, the base station 10 and the optical repeaters 20 and 30 are connected through the optical cable when the base station 10 uses multiple antennas. In this instance, the respective optical repeaters 20 and 30 must include the same number of antennas as the base station 10, and the multiple antennas of the optical repeaters 20 and 30 must match the multiple antennas of the base station 10. According to the above-noted connection, it is possible to transmit the SDMA-based data streams to the terminal positioned in the repeating region.

A connection method between a base station and an RF repeater in the case of using the RF repeater from among various repeaters will now be described with reference to FIG. 3.

Figure 3:
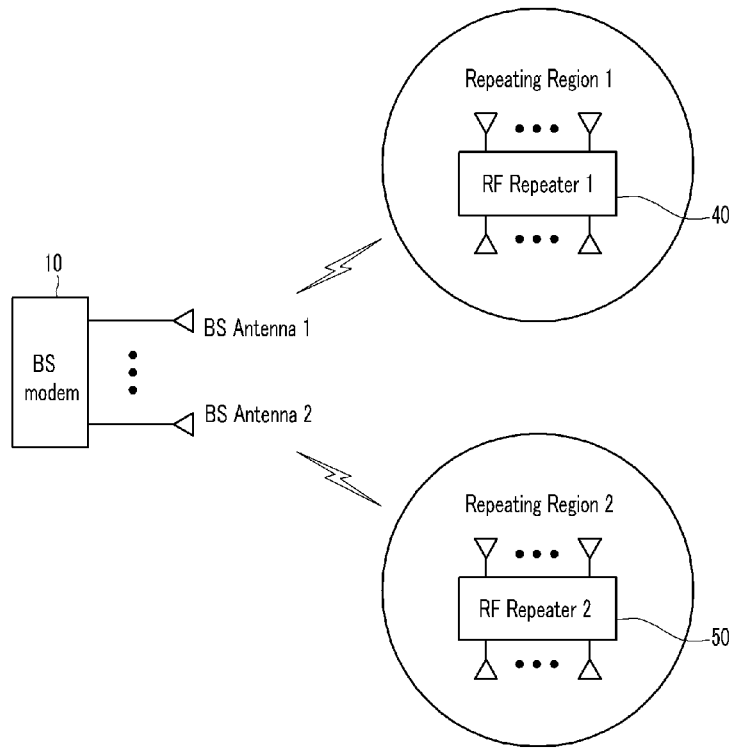
FIG. 3 shows a method for connecting a base station using general multiple antennas and a radio frequency (RF) repeater.

FIG. 3 shows a connection method between a base station using general multiple antennas and an RF repeater.

As shown in FIG. 3, in the repeating system using an RF repeater, the RF signal is wirelessly transmitted/received between the base station 10 and the RF repeaters 40 and 50. Therefore the installation fee of optical cables can be reduced in realizing the repeating system, and the repeating system can be easily designed.

That is, the base station 10 using multiple antennas and the RF repeaters 40 and 50 located in the blanket area receive the RF signal from the base station 10 by using the same number of receive antennas as the multiple antennas of the base station 10. The RF repeaters 40 and 50 amplify the received signals and output the amplified signals to the repeating region through the same number of transmit antennas as the multiple antennas of the base station 10. For this, the RF repeaters 40 and 50 must include the same number of receive antennas and transmit antennas as the multiple antennas of the base station 10.

When the optical repeater or the RF repeater are used to be connected to the base station as described above, a plurality of antennas and a plurality of optical cables are used, thereby increasing the installation cost. Further, the installation cost is increased since the repeater has a plurality of antennas. Therefore, a connection structure between the base station and the repeater for efficiently using the spatial division multiple access scheme is proposed in the exemplary embodiment of the present invention, which will now be described with reference to FIG. 4 and FIG. 5. The multi-input multi-output (MIMO) system will be exemplified in the exemplary embodiment of the present invention, although other systems are also applicable.

Figure 4:
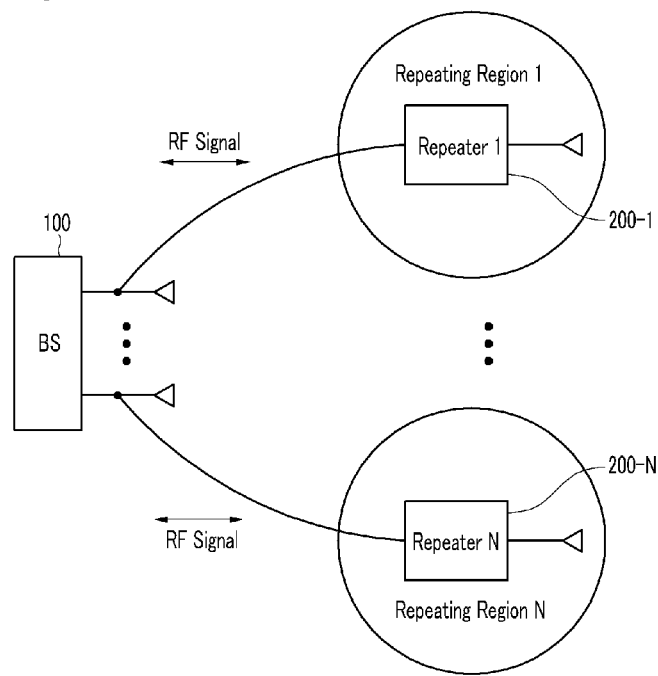
FIG. 4 shows a method for connecting a base station according to a first exemplary embodiment of the present invention and a repeater.

FIG. 4 shows a connection structure between a base station and a repeater according to a first exemplary embodiment of the present invention.

As shown in FIG. 4, the connection structure according to the first exemplary embodiment of the present invention is given between a single base station 100 and a plurality of repeaters (200-1 to 200-N). In this instance, the base station 100 has the same number N of antennas as the repeater (200-1 to 200-N), and the respective repeaters use a single antenna.

The antenna of the base station 100 and the single antennas of the repeaters (200-1 to 200-N) are independently connected one by one. Here, the independence means that the respective repeaters (200-1 to 200-N) are connected to a single antenna of the base station 100 and the data streams are transmitted to the terminal through the signal per base station antenna so that the signal per base station antenna may not interfere with the repeaters (200-1 to 200-N).

The repeater according to the first exemplary embodiment of the present invention will be exemplified to use an optical repeater, although the first exemplary embodiment of the present invention is not restricted thereto. For example, the connection structure according to the first exemplary embodiment of the present invention can be provided by using a microwave repeater for using different frequencies for the respective antennas.

When the antenna of the base station 100 and the antennas of a plurality of repeaters (200-1 to 200-N) are connected one by one, the terminal belonging to each repeater region identifies the repeater region to which the terminal belongs as the antenna of the base station 100. For example, the terminal located in the repeater region 1 receives a pilot signal from the base station antenna 1, and the terminal located in the repeater region 2 receives a pilot signal from the base station antenna 2.

Here, the pilot signal is not a signal that is separately generated so as to be provided to the repeaters (200-1 to 200-N) by the base station 100, but it is included in the data symbol such as a preamble signal or a traffic signal. For convenience of description, the signal will be called a pilot signal.

When transmitting/receiving the data symbol in the MIMO system, the time interval for the base station to transmit a pilot signal to the terminal by using a plurality of antennas is predetermined, and the power intensity of the pilot signal is constant. Therefore, the terminal can detect the repeater region to which the terminal belongs based on the received pilot signal. That is, the respective terminals in the repeating regions compare power of the pilot signal transmitted by the base station 100, and checks to which repeater (200-1, 200-N) region connected to the antenna of the base station the terminal belongs through the base station antenna having transmitted the pilot signal having the greatest power.

When the terminal belongs not to the repeater region but to the base station region, the terminal uniformly receives the pilot signals for the respective antennas transmitted to a plurality of repeaters at regular time intervals and with the same power intensity. Therefore, the terminal checks that the terminal is provided in the non repeater region, that is, the base station region.

The terminal having identified the repeater (200-1, 200-N) region feeds repeater region information back to the base station, and the base station 100 applies it to the SDMA by using the pilot signal information provided by the terminal. Here, the repeater region information can be fed by using index information that is predefined in the system design, and the embodiment is not restricted thereto. Also, the terminal belonging to the base station region feeds a plurality of pilot signal information received by the terminal back to the base station so that the base station may check the terminal that is included in the region of the base station.

The base station 100 receives repeater region information from a plurality of terminals and uses it to select the terminal that does not interfere with other terminals when transmitting/receiving data streams to/from a plurality of terminals provided in a single repeater region. Here, when selecting one terminal from among a plurality of terminals located in a single repeater region, a terminal is selected according to a scheduling algorithm for selecting the terminals with great capacity when simultaneously transmitting the data in combination with a terminal having a great priority or a terminal provided in another repeater region. The scheduling algorithm is well known and will not be described in the exemplary embodiment of the present invention. The base station simultaneously transmits the data stream for the respective antennas or receives the data stream from the terminal to allow the SDMA.

The SDMA in the general OFDMA is used for the subchannel structure in which the subcarriers are arranged to be near with each other and form a band. The band subchannel structure is applicable to the area in which the terminal has a low speed. However, it is difficult to use the SDMA since the channel characteristics of the subcarriers are different in the diversity subchannel structure having subcarriers with gaps therebetween.

The terminals are divided by the repeater region in the exemplary embodiment of the present invention, and the SDMA can be efficiently applied since the terminals can be divided by the repeater region irrespective of the subchannel structure. That is, the SDMA is applied irrespective of the subchannel structure, and robust mobility is acquired since a diversity subchannel structure robust for the terminal speed can be used.

The structure shown in FIG. 4 includes a single optical fiber cable in the repeater region in a like manner of the existing single antenna base station, and a single RF transmitting/receiving module is installed. However, when the base station 100 uses a plurality of antennas, the structure of FIG. 4 can be extended as that of FIG. 5.

Figure 5:
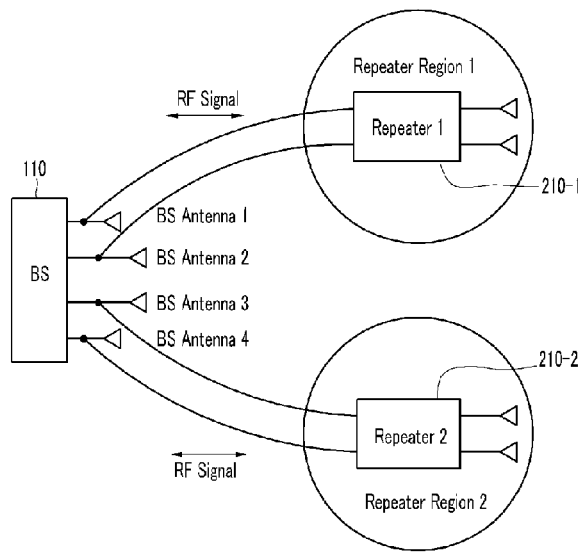
FIG. 5 shows a method for connecting a base station according to a second exemplary embodiment of the present invention and a repeater.

FIG. 5 shows a connection structure between a base station and a repeater according to a second exemplary embodiment of the present invention.

As shown in FIG. 5, a method for connecting a base station 110 having four antennas (base station antennas 1, 2, 3, and 4) and two repeaters i.e., first and second repeaters (210-1, 201-2) will be exemplified, but the embodiment is not restricted thereto. In the second exemplary embodiment of the present invention, the base station antennas 1, 2 are connected to the first repeater 210-1, and the base station antennas 3, 4 are connected to the second repeater 210-2. When the first repeater 210-1 is assumed to have a single antenna and the second repeater 210-2 is assumed to have three antennas, the antenna of the first repeater 210-1 is connected to the base station antenna 1 and the antenna of the second repeater 210-2 is connected to the base station antennas 2, 3, and 4.

In this instance, the combination set per base station antenna can be differed so that the repeater region divided by the pilot signal per repeater (210-1, 201-2) region may be different. A plurality of terminals in the respective repeater (210-1, 201-2) regions can identify the repeater region by the pilot signals of the respective antennas, and feeds the pilot information provided by the base station 110 back to the base station 110. On receiving the pilot information, the base station 110 identifies the terminal according to the repeater (210-1, 201-2) regions to perform scheduling and then perform the SDMA.

When the structures of the first exemplary embodiment and the second exemplary embodiment described with reference to FIG. 4 and FIG. 5 are used, partial antenna signals from among the base station antennas are connected in the repeater region. When the base station 110 having a plurality of antennas transmits common control information to the terminal by using the first antenna, there may be terminals that are provided in the blanket area and fail to receive the common control information from among the plurality of terminals. To prevent this problem, the antennas of all the base stations are connected to the terminals in the repeater region in the exemplary embodiment of the present invention.

In this instance, when cyclic delay diversity (CDD) is used in the case of transmitting a common control information signal for controlling a plurality of terminals provided in the repeater region, the signal can be transmitted by using all the antennas of the base station 110, and the common control information signal received by the terminal can be easily demodulated in the repeater region. The cyclic delay diversity (CDD) will not be described in the exemplary embodiment of the present invention since it is well known to a skilled person.

A repeating method in a system configured by one of the structures shown in FIG. 4 and FIG. 5 will now be described with reference to FIG. 6.

Figure 6:
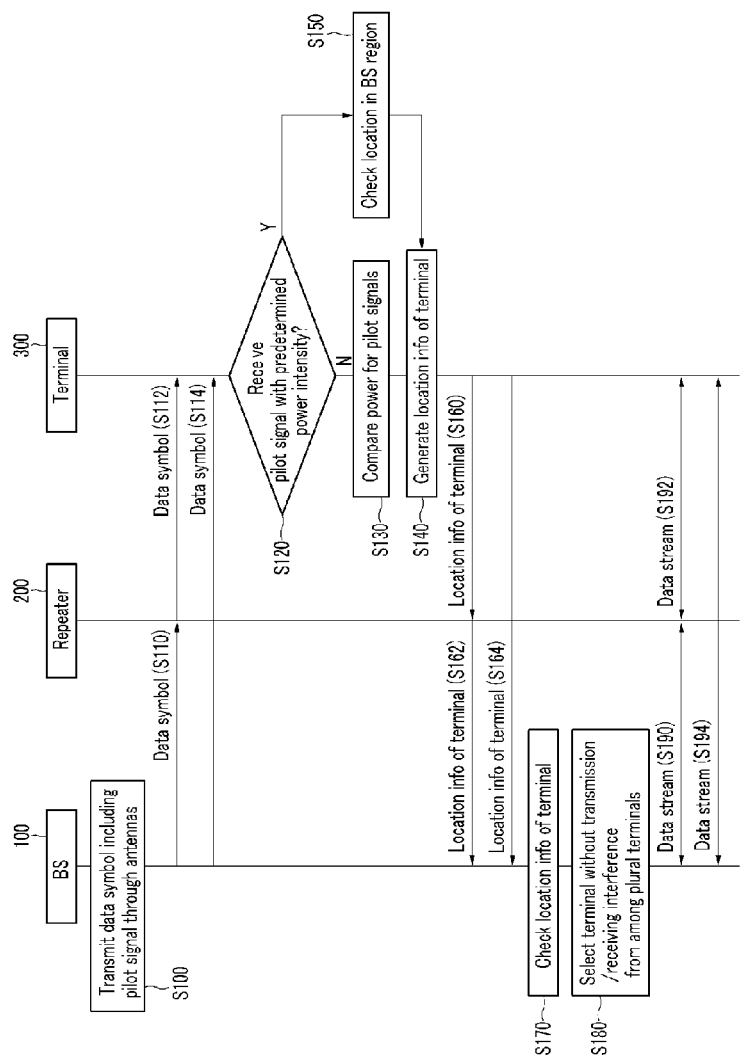
FIG. 6 shows a flowchart of a repeating method according to an exemplary embodiment of the present invention.

FIG. 6 shows a flowchart of a repeating method according to an exemplary embodiment of the present invention.

As shown in FIG. 6, the base station 100 generates a data symbol and transmits it to a plurality of terminals (S100). In this instance, the generated data symbol includes a pilot signal, and the terminal checks to which repeater region or the base station 100 region the terminal belongs by using the pilot signal. That is, the pilot signal includes an identifier of the base station antenna, and the terminal having received the pilot signal checks the location of the terminal through the identifier of the base station antenna.

In order to transmit the data symbol to a plurality of terminals provided in the base station 100 region or the terminal 300 included in the repeater 200 that is installed for the blanket area or for extending the cell region, the data symbol transmitted by the base station 100 is transmitted to the terminal 300 through the repeater 200 (S110 and S112). In this instance, data symbol transmission between the base station 100 and the repeater 200 is performed one by one by using the connected optical cable. Also, the data symbol is directly transmitted to the terminal 300 that is not provided in the repeater region from the base station 100 (S114).

A plurality of terminals 300 that are provided in the repeater region or the base station region determine whether they have received the pilot signal with constant power intensity (S120). When not continuously having received the pilot signal, they collect the pilot signal in the received data symbol, and compare power of the collected pilot signals (S130) to check information on the repeater region in which they are located. That is, the terminals 300 compare the power intensities of a plurality of collected pilot signals, and detect the pilot signal having the greatest power intensity. Since the repeater to which the terminal belongs amplifies the power of the corresponding pilot signal and transmits it to the terminal, the terminal can know the base station antenna to which the terminal transmitted the received pilot signal, and antenna information of the known base station 100 is information of the repeater 200 region in which the terminal is located.

For example, the data symbol generated by the base station 100 having N antennas includes the same number N of pilot signals. The base station 100 outputs the generated data symbol through the N antennas to the N repeaters that are connected one by one to the N antennas in addition to the terminals that are in the base station 100 region.

The data symbol transmitted to the repeater 200 is transmitted to the terminals 300 in the repeater region, and the terminals 300 compare the power intensities of the pilot signals of the received data symbols (S130). Since the terminals in the repeater region cannot receive the data symbols that are transmitted to the terminals in other repeater regions, the terminals that are provided in the repeater region 1 connected to the antenna 1 of the base station receive the data symbols that are output through the antenna 1 of the base station. Therefore, since the power of the pilot signal in the data symbol output through the antenna of the base station 1 is the greatest in the terminals in the repeater region 1, the terminal 300 can detect that the terminal 300 is in the repeater region 1.

However, when receiving the pilot signal with constant power intensity, the terminal 300 checks that the terminal 300 is located in the base station 100 region (S150). That is, the terminals in the base station 100 region can receive the data symbols. In this instance, since the base station 100 outputs data symbols according to constant power by using a predetermined time frame by using the N antennas according to the MIMO scheme, the terminal has a great probability of receiving the pilot signals included in the respective data symbols with the same power intensity. Therefore, the terminals can be determined to be in the base station region when receiving the pilot signals with the same power intensity.

The terminals 300 having checked the repeating region through the pilot signals feed the repeating region information checked by the terminals 300 back to the base station 100 (S160 and S162). In this instance, the repeater region information (also called terminal location information) can be generated as a predefined format in the system design. The base station 100 having received the repeater region information from the terminal 300 checks the location information of the terminal 300, that is, information of the repeater 200 for managing the terminal 300. Here, in order to receive the pilot signal and notify existence in the base station region, the terminals in the base station region not belonging to the repeater region generate base station region information and feeds it back to the base station 100 (S164).

The base station 100 checks location information of respective terminals based on repeater region information or base station region information fed by a plurality of terminals 300 (S170), and determines to which one of the plurality of terminals in one repeater region the base station 100 must transmit the data symbol. In this instance, the base station 100 selects the terminal that will not generate interference from among the plurality of terminals when transmitting/receiving the data stream (S180).

In other words, a plurality of terminals can be located in a single repeater 200 region, and when attempting to transmit the data symbol to the plurality of terminals by using a single repeater antenna or a plurality of repeater antennas, it is needed to transmit the data symbols that are not interfered with each other to the terminals. Therefore, the base station 100 must select one of the plurality of terminals based on terminal location information according to a predetermined scheduling algorithm. Here, the scheduling algorithm is well known and will not be described in the exemplary embodiment of the present invention.

Finally, the base station 100 transmits the data stream to the selected terminal 300 by using the SDMA (S190 and S192). Here, the base station 100 can directly transmit the data stream to the terminal in the base station region through the base station antenna S194. In this instance, the data symbol and the data stream are described as different for convenience of description, but they are not always different.

Transmitting the data stream in a downlink transmission from the base station according to the exemplary embodiment of the present invention to the terminal has been described in FIG. 6, but alternatively the data stream can be transmitted from the terminal to the base station through an uplink transmission.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for repeating a data stream transmitted by a base station including a plurality of antennas to a terminal in a region of a repeater, the method comprising:
   transmitting a plurality of data symbols including a plurality of pilot signals, a number of the pilot signals corresponding to a number of the antennas;
   receiving region information generated based on the plurality of pilot signals from a plurality of terminals;
   checking location information on the plurality of terminals based on the region information, and selecting a terminal for transmitting the data stream from among at least one terminal located in the region of the repeater; and
   transmitting the data stream to the selected terminal,
   wherein the repeater is connected to a subset of the plurality of antennas comprising at least one but fewer than all of the plurality of antennas, the subset comprising one antenna uniquely corresponding to each antenna of the repeater.

2. The method of claim 1, wherein the transmitting of the plurality of data symbols includes transmitting a data symbol including a pilot signal corresponding to each antenna from among the plurality of pilot signals through the corresponding antenna.

3. The method of claim 2, wherein the plurality of pilot signals respectively includes an identifier of the corresponding antenna.

4. The method of claim 2, wherein the region information is generated based on a power of the pilot signal received by the terminal from among the plurality of pilot signals.

5. The method of claim 2, wherein when the number of antennas of the repeater is given as 1, the antenna of the repeater is connected to an antenna of the plurality of antennas of the base station.

6. The method of claim 2, wherein when the repeater includes a first repeater antenna and a second repeater antenna, the first repeater antenna is connected to a first antenna from among the plurality of antennas of the base station, and the second repeater antenna is connected to a second antenna other than the first antenna from among the plurality of antennas of the base station.

7. The method of claim 6, wherein another repeater different from the repeater is connected to an antenna of the base station that is not connected to the repeater.

8. The method of claim 7, wherein when the repeater and the other repeater include a plurality of antennas, a plurality of antennas of the repeater are connected to the antennas of the base station by a number of antennas of the repeater, and the other repeater is connected to an antenna of the base station other than the antenna of the base station connected to the repeater.

9. The method of claim 1, wherein the transmitting includes transmitting the data stream by the spatial division multiple access scheme.

10. The method of claim 9, wherein
    the repeater includes one of a microwave repeater, a radio frequency repeater, and an optical repeater.

11. The method of claim 10, wherein
    the base station transmits common control information to the terminals in the system by using the at least one base station antenna according to cyclic delay diversity, and the common control information represents information for controlling a plurality of terminals located in the repeater region.

12. A repeating method for a terminal to receive a data stream from a base station including a plurality of antennas through a repeater, the repeating method comprising:
    receiving a data symbol including a pilot signal from the base station, the pilot signal corresponding to one of the plurality of antennas;
    checking a location region of the repeater in which region terminal is located according to a power of the pilot signal;
    generating terminal location information of the terminal through the checked location region and transmitting the terminal location information to the base station; and
    receiving a data stream from the base station.

13. The method of claim 12, wherein the checking of the location region of the repeater includes:
    determining whether a plurality of pilot signals transmitted from the plurality of antennas are received by a predetermined constant intensity; and
    when the pilot signals are received by the constant intensity, determining that the terminal is provided in a base station region and checking the location region.

14. The method of claim 13, wherein
    when the plurality of pilot signals are not received by the constant intensity, comparing power intensities of the plurality of pilot signals;
    checking information of a pilot signal having a greatest power intensity from among the plurality of pilot signals according to the comparison result; and
    checking the repeater region of the terminal as a location region based on information on the pilot signal having the greatest power intensity.

15. A repeater for repeating a data stream transmitted by a base station including a plurality of antennas to a terminal in its region, the repeater comprising:
    antennas for transmitting a plurality of data symbols including a plurality of pilot signals, a number of the pilot signals corresponding to a number of the plurality of antennas, and receiving region information generated based on the plurality of pilot signals from a plurality of terminals,
    wherein the repeater checks location information on the plurality of terminals based on the region information, selects a terminal for transmitting the data stream from among at least one terminal located in the region of the repeater, and transmits the data stream to the selected terminal, and
    wherein the repeater is connected to a subset of the plurality of antennas comprising at least one but fewer than all of the plurality of antennas, the subset comprising one antenna uniquely corresponding to each antenna of the repeater.

16. The repeater of claim 15, wherein the antennas for transmitting a plurality of data symbols include a first repeater antenna and a second repeater antenna, the first repeater antenna being connected to a first antenna from among the plurality of antennas of the base station and the second repeater antenna being connected to a second antenna other than the first antenna from among the plurality of antennas of the base station.

17. The repeater of claim 15, wherein each of the plurality of pilot signals respectively includes an identifier of the corresponding antenna.

18. The repeater of claim 15, wherein the region information is generated based on a power of the pilot signal received by the terminal from among the plurality of pilot signals.

* * * * *